United States Patent
Morita et al.

(10) Patent No.: US 12,060,057 B2
(45) Date of Patent: Aug. 13, 2024

(54) AUTOMATED PARKING SYSTEM, SETTING METHOD, AND STORAGE MEDIUM

(71) Applicant: TOYOTA JIDOSHA KABUSHIKI KAISHA, Toyota (JP)

(72) Inventors: Koji Morita, Gotemba (JP); Tatsuya Sugano, Sunto-gun Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/893,439

(22) Filed: Aug. 23, 2022

(65) Prior Publication Data
US 2023/0110755 A1 Apr. 13, 2023

(30) Foreign Application Priority Data
Oct. 5, 2021 (JP) .................................. 2021-164228

(51) Int. Cl.
| | |
|---|---|
| *G08G 1/14* | (2006.01) |
| *B60W 30/06* | (2006.01) |
| *B60W 30/095* | (2012.01) |
| *B60W 30/14* | (2006.01) |
| *B60W 30/16* | (2020.01) |
| *B60W 30/182* | (2020.01) |
| *B60W 30/194* | (2012.01) |
| *B60W 40/02* | (2006.01) |

(52) U.S. Cl.
CPC ........ *B60W 30/06* (2013.01); *B60W 30/0956* (2013.01); *B60W 30/143* (2013.01); *B60W 30/16* (2013.01); *B60W 30/182* (2013.01); *B60W 30/194* (2013.01); *B60W 40/02* (2013.01); *B60W 2510/184* (2013.01); *B60W 2555/20* (2020.02); *B60W 2556/40* (2020.02)

(58) Field of Classification Search
USPC ..... 340/932.2, 938, 991–994, 995.1, 995.12, 340/995.25–995.28, 427, 426.16, 426.23, 340/466–467
See application file for complete search history.

(56) References Cited

U.S. PATENT DOCUMENTS

| | | | | |
|---|---|---|---|---|
| 5,832,400 | A * | 11/1998 | Takahashi | B60W 30/1819 701/53 |
| 2003/0217880 | A1* | 11/2003 | Isogai | B60W 30/16 180/170 |
| 2005/0143895 | A1* | 6/2005 | Kato | B60W 30/16 180/170 |
| 2006/0089770 | A1* | 4/2006 | Ito | B62D 1/286 180/443 |
| 2009/0055069 | A1* | 2/2009 | Lindqvist | G01S 13/931 180/170 |

(Continued)

FOREIGN PATENT DOCUMENTS

| | | |
|---|---|---|
| JP | 2007030851 A | 2/2007 |
| JP | 2020131787 A | 8/2020 |

(Continued)

*Primary Examiner* — Daniel Previl
(74) *Attorney, Agent, or Firm* — Dinsmore & Shohl LLP (57) ABSTRACT

An automated parking system is equipped with an estimation unit that estimates a state of a target vehicle, and a setting unit that sets a running mode of the target vehicle as a low-risk running mode in which a risk regarding the target vehicle is reduced, on condition that the target vehicle be in a low-temperature state.

11 Claims, 6 Drawing Sheets

(56) References Cited

U.S. PATENT DOCUMENTS

| | | | |
|---|---|---|---|
| 2010/0253493 A1* | 10/2010 | Szczerba | G02B 27/01 345/593 |
| 2019/0063603 A1* | 2/2019 | Hiasa | B60K 6/547 |
| 2020/0097014 A1* | 3/2020 | Wang | B60W 30/06 |
| 2020/0290649 A1* | 9/2020 | Yamane | B60K 35/80 |

FOREIGN PATENT DOCUMENTS

| | | |
|---|---|---|
| JP | 2020-149233 A | 9/2020 |
| JP | 2020-199814 A | 12/2020 |

\* cited by examiner

FIG. 5A
AT TIME OF NORMAL RUNNING

FIG. 5B
AT TIME OF LOW-TEMPERATURE DETERMINATION

AUTOMATED PARKING SYSTEM, SETTING METHOD, AND STORAGE MEDIUM

CROSS-REFERENCE TO RELATED APPLICATION

This application claims priority to Japanese Patent Application No. 2021-164228 filed on Oct. 5, 2021, incorporated herein by reference in its entirety.

BACKGROUND

1. Technical Field

The disclosure relates to technical fields of an automated parking system, a setting method in the automated parking system, and a storage medium.

2. Description of Related Art

As an art applicable to this kind of system, there is proposed, for example, an art of preventing the braking performance from deteriorating in a cold state by determining that a friction brake is in a specific state if the temperature of the friction brake is equal to or lower than a set value or the friction brake has been out of use for a predetermined time, and operating the friction brake more actively when it is determined that the friction brake is in the specific state than when it is not determined that the friction brake is in the specific state in the case where a driver requests deceleration of a vehicle (see Japanese Unexamined Patent Application Publication No. 2020-199814 (JP 2020-199814 A)). As another related art, it is possible to mention Japanese Unexamined Patent Application Publication No. 2020-149233 (JP 2020-149233 A). In JP 2020-149233 A, there is disclosed an art of causing a vehicle to automatically run to a boarding position for a user by performing at least one of speed control and steering control based on a result of recognition of an environment around the vehicle, in response to reception of a trigger transmitted from a device outside the vehicle.

SUMMARY

When a vehicle starts running after being parked in a parking lot for a long time under a low-temperature environment, the braking distance of the vehicle may be lengthened due to, for example, a deterioration in the performance of a friction brake. There are a relatively large number of parked vehicles (i.e., obstacles) in the parking lot, and there are other vehicles running in the parking lot. Therefore, when the vehicle with the performance of the friction brake having deteriorated as a result of the low-temperature environment runs in the parking lot, the level of safety in the parking lot may fall. The foregoing conventional art cannot cope with this problem sufficiently.

The disclosure has been made in view of the foregoing problem. It is a task of the disclosure to provide an automated parking system, a setting method, and a storage medium that can restrain the level of safety in a parking lot from falling.

An automated parking system according to one aspect of the disclosure is equipped with an estimation unit that estimates a state of a target vehicle, and a setting unit that sets a running mode of the target vehicle as a low-risk running mode in which a risk regarding the target vehicle is reduced, on condition that the target vehicle be in a low-temperature state.

A setting method according to another aspect of the disclosure is a setting method in an automated parking system. The setting method includes an estimation process in which the automated parking system estimates a state of a target vehicle, and a setting process in which the automated parking system sets a running mode of the target vehicle as a low-risk running mode in which a risk regarding the target vehicle is reduced, on condition that the target vehicle be in a low-temperature state.

A storage medium according to still another aspect of the disclosure stores a computer program that causes a computer with which an automated parking system is equipped to function as an estimation unit that estimates a state of a target vehicle, and a setting unit that sets a running mode of the target vehicle as a low-risk running mode in which a risk regarding the target vehicle is reduced, on condition that the target vehicle be in a low-temperature state.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

<Automated Parking System>

An automated parking system according to one of the embodiments will be described with reference to FIGS. 1 to 5. In this case, an automated parking system regarding automated valet parking (AVP) is cited as an example. In automated valet parking, after a user gets out of a vehicle, the vehicle runs in a self-propelled manner in a parking lot, and is automatically parked in a parking space. Besides, when a request for unloading is made, the vehicle runs in an automated manner in the parking lot, and automatically stops near a boarding position for the user.

First of all, the outline of automated valet parking will be described. In this case, a parking lot shown in FIG. 1 is cited as an example of a parking lot to which automated valet parking is applied.

Figure 1:
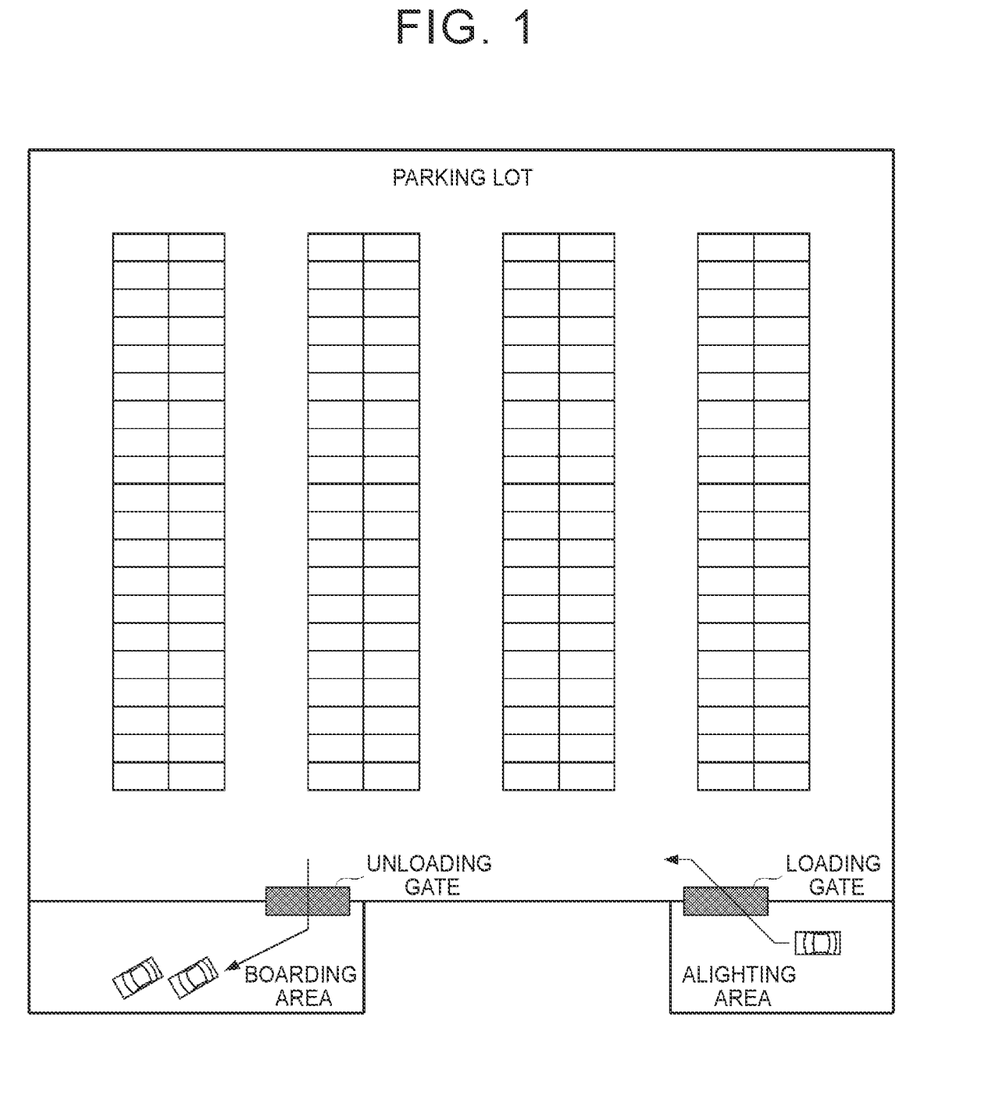
FIG. 1 is a view showing an example of a parking lot.

In FIG. 1, a user gets out of a vehicle in an alighting area, and gets on a vehicle in a boarding area. When being parked, a vehicle having the function of automated driving passes through a loading gate, enters the parking lot, and is automatically parked in a parking space. When being unloaded, the vehicle having the function of automated driving passes through an unloading gate, exits the parking lot, and automatically stops in a waiting space (not shown) of the boarding area.

Figure 2:
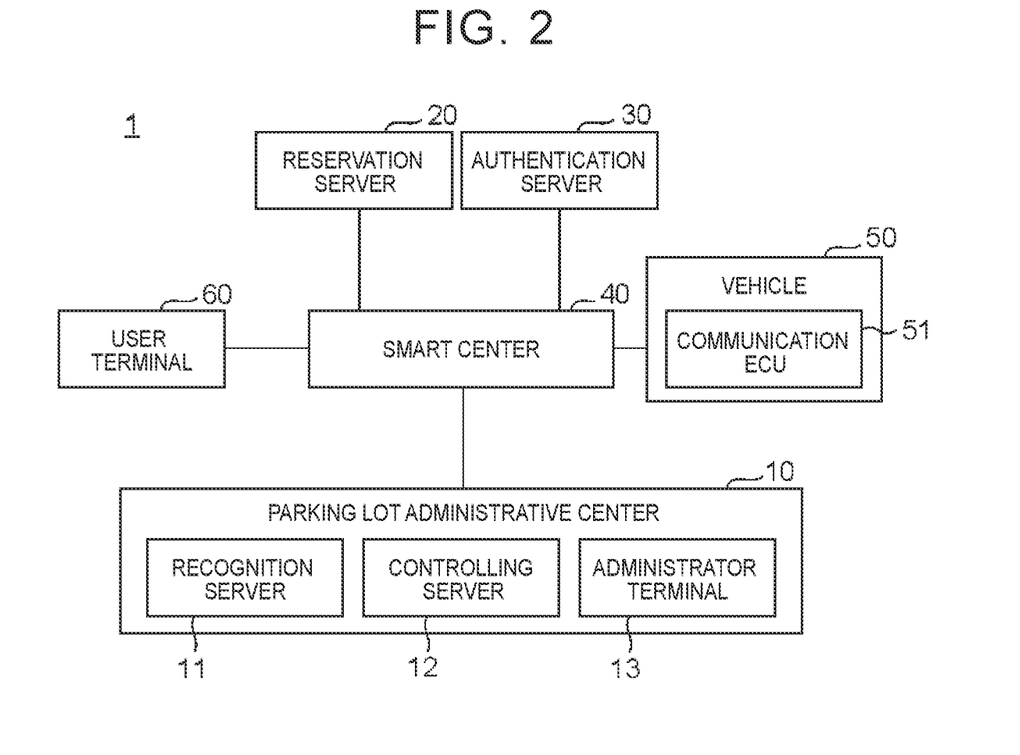
FIG. 2 is a view showing the configuration of a system according to one of the embodiments.

A system 1 that enables automated valet parking will be described with reference to FIG. 2. In FIG. 2, the system 1 is configured to be equipped with a parking lot administrative center 10, a reservation server 20, an authentication server 30, a smart center 40, a vehicle 50, and a user terminal 60.

The smart center 40 spreads information such that the parking lot administrative center 10, the reservation server 20, the authentication server 30, the vehicle 50, and the user terminal 60 share the information. That is, the smart center 40 corresponds to a so-called data hub. Incidentally, the system 1 may not be equipped with the smart center 40.

The vehicle 50 is a vehicle having the function of automated driving. The user terminal 60 is a terminal (e.g., a smartphone) possessed by the user of the vehicle 50. Incidentally, although there are a plurality of vehicles and a plurality of user terminals, only the vehicle 50 and the user terminal 60 are depicted to prevent the description from becoming complicated. Besides, the user of the user terminal 60 may not own the vehicle 50 (i.e., the vehicle 50 may be a hired vehicle or the like).

The operation of the system 1 will be described by citing concrete examples. Incidentally, four concrete examples, namely, "an operation of parking the vehicle owned by the user", "an operation of unloading the vehicle owned by the user", "an operation of hiring out the vehicle", and "an operation of returning the vehicle" will be cited in the following description. For the sake of convenience, however, "the vehicle 50" and "the user terminal 60" will be mentioned in all the concrete examples.

(Operation of Parking Vehicle Owned by User)

The operation in the case where the user parks his or her own vehicle 50 in the parking lot will be described. After the vehicle 50 arrives in the alighting area (see FIG. 1), the user carries out a predetermined check-in procedure. More specifically, a predetermined authentication process is first performed between the user terminal 60 and the authentication server 30 via the smart center 40. When authentication is successful, a predetermined check-in process (e.g., the confirmation of a reservation, the filing of a new application, and the acquisition of information on the target vehicle) is performed between the user terminal 60 and the reservation server 20 via the smart center 40. At this time, the reservation server 20 may inquire the parking lot administrative center 10 about, for example, a parking situation, via the smart center 40.

When the check-in process is successful, the user terminal 60 may notify the user of a message saying, for example, "Validate the function of automated driving and close the doors". When the check-in process is successful, the reservation server 20 transmits information on the vehicle 50 as the target vehicle and the like to the parking lot administrative center 10 via the smart center 40.

The parking lot administrative center 10 that has received the information on the vehicle 50 communicates with the vehicle 50 (more specifically, a communication electronic control unit (ECU) 51) via the smart center 40. At this time, the parking lot administrative center 10 may confirm the state of the vehicle 50 (e.g., whether the doors are open or closed, and a shift position). The parking lot administrative center 10 transmits, for example, information on a running route and the like to the vehicle 50 via the smart center 40.

The vehicle 50 that has received the information on the running route and the like moves along the running route indicated by the information, through the function of automated driving, and is parked in a predetermined parking space. When the parking of the vehicle 50 is completed, the parking lot administrative center 10 may transmit, for example, information indicating the completion of parking, a parking position, and the like to the user terminal 60 via the smart center 40.

(Operation of Unloading Vehicle Owned by User)

The operation in the case where the user unloads his or her own vehicle 50 parked in the parking lot will be described. The user makes a reservation for an unloading time in the reservation server 20 or issues unloading instructions to the reservation server 20, through the use of the user terminal 60. When the reserved unloading time approaches or the unloading instructions are issued, the reservation server 20 transmits information on the vehicle 50 as the target vehicle linked with the user terminal 60, and information indicating the unloading time or the unloading instructions to the parking lot administrative center 10 via the smart center 40.

The parking lot administrative center 10 that has received the information on the vehicle 50 and the like communicates with the vehicle 50 via the smart center 40. At this time, the parking lot administrative center 10 transmits, for example, information on the running route and the like to the vehicle 50 via the smart center 40. The vehicle 50 that has received the information on the running route and the like moves to the boarding area (see FIG. 1) along the running route indicated by the information, through the function of automated driving, stops, and then stands by.

The user who has confirmed the vehicle 50 in the boarding area carries out a predetermined check-out procedure. More specifically, a predetermined authentication process is first performed between the user terminal 60 and the authentication server 30 via the smart center 40. When authentication is successful, a predetermined check-out process (e.g., the confirmation of a tariff, and the procedure of payment) is performed between the user terminal 60 and the parking lot administrative center 10 via the smart center 40.

(Operation of Hiring Out Vehicle)

The operation in the case where the user hires the vehicle 50 parked in the parking lot for, for example, a rental service or a sharing service will be described. The user carries out a use reservation procedure through the use of the user terminal 60. More specifically, a predetermined authentication process is performed between the user terminal 60 and the authentication server 30 via the smart center 40. When authentication is successful, a predetermined use reservation process (e.g., the inputting of a use starting time and a scheduled returning time, and the selection of a vehicle to be hired out) is performed between the user terminal 60 and the reservation server 20 via the smart center 40.

After the end of the use reservation process, the reservation server 20 transmits, for example, information on the vehicle 50 to be hired out, information on the user (or the user terminal 60), and the like to the parking lot administrative center 10 via the smart center 40.

The parking lot administrative center 10 that has received the information on the vehicle 50 and the like communicates with the vehicle 50 via the smart center 40. At this time, the parking lot administrative center 10 transmits, for example, information on a running route and the like to the vehicle 50 via the smart center 40. The vehicle 50 that has received the information on the running route and the like moves to the boarding area (see FIG. 1) along the running route indicated by the information, through the function of automated driving, stops, and then stands by.

The user who has confirmed the vehicle 50 in the boarding area carries out a predetermined use starting procedure. More specifically, a predetermined authentication process is first performed between the user terminal 60 and the authentication server 30 via the smart center 40. When authentication is successful, a predetermined use starting process (e.g., the cross-checking of information on the user (or the user terminal 60)) is performed between the user terminal 60 and the parking lot administrative center 10 via the smart center 40. When the use starting process is successful, the parking lot administrative center 10, for example, unlocks the doors of the vehicle 50 to allow the user to get on the vehicle 50.

(Operation of Returning Vehicle)

The operation in the case where the user returns the vehicle 50 that has been hired as, for example, a rental service or a sharing service will be described. After the vehicle 50 arrives in the alighting area (see FIG. 1), the user performs a predetermined use ending procedure. More specifically, a predetermined authentication process is first performed between the user terminal 60 and the authentication server 30 via the smart center 40. When authentication is successful, a predetermined use ending process (e.g., the confirmation of information on the user (or the user terminal 60) and information input at the time when the vehicle 50 is hired out, and the procedure of payment) is performed between the user terminal 60 and the reservation server 20 via the smart center 40.

When the use ending process is successful, the reservation server 20 transmits information on the vehicle 50 as the target vehicle linked with the user terminal 60, and the like to the parking lot administrative center 10 via the smart center 40.

The parking lot administrative center 10 that has received the information on the vehicle 50 communicates with the vehicle 50 via the smart center 40. At this time, the parking lot administrative center 10 may confirm the state of the vehicle 50 (e.g., whether the doors are open or closed, and the shift position). The parking lot administrative center 10 transmits, for example, information on a running route and the like to the vehicle 50 via the smart center 40. The vehicle 50 that has received the information on the running route and the like moves along the running route indicated by the information, through the function of automated driving, and is parked in a predetermined parking space.

By the way, the vehicle may be parked for a relatively long time under a low-temperature environment (e.g., an environment in which the outside air temperature is below zero). In this case, the performance of a friction brake of the vehicle may deteriorate as a result of a fall in the temperature of brake fluid. As a result, for example, the braking distance of the vehicle may be lengthened. If no measure is taken at this time, the risk of the vehicle with the deteriorated performance of the friction brake colliding with, for example, an obstacle may be enhanced.

As a solution to this problem, it is estimated in the system 1 whether or not the performance of the friction brake has deteriorated as a result of a low-temperature environment. Then in the system 1, the running mode of the vehicle is set as a running mode in which the foregoing risk is reduced, in accordance with a result of the estimation. The operation of the parking lot administrative center 10 constituting the core of the system 1 will be specifically described hereinafter with reference to FIGS. 3 to 5 as well as FIG. 2.

In FIG. 2, the parking lot administrative center 10 is configured to be equipped with a recognition server 11, a controlling server 12, and an administrator terminal 13. The recognition server 11 acquires, for example, an image of a camera or images of a plurality of cameras, and recognizes a situation of the parking lot and the like (e.g., the position of the running vehicle, whether or not there is an obstacle, and pedestrians in the alighting area and the boarding area). The controlling server 12 controls the running of a vehicle that is about to be parked, and the running of a vehicle that is about to be unloaded. The administrator terminal 13 is used by the administrator of the parking lot, for example, to confirm the situations of the vehicles controlled by the controlling server 12, and the like.

Figure 3:
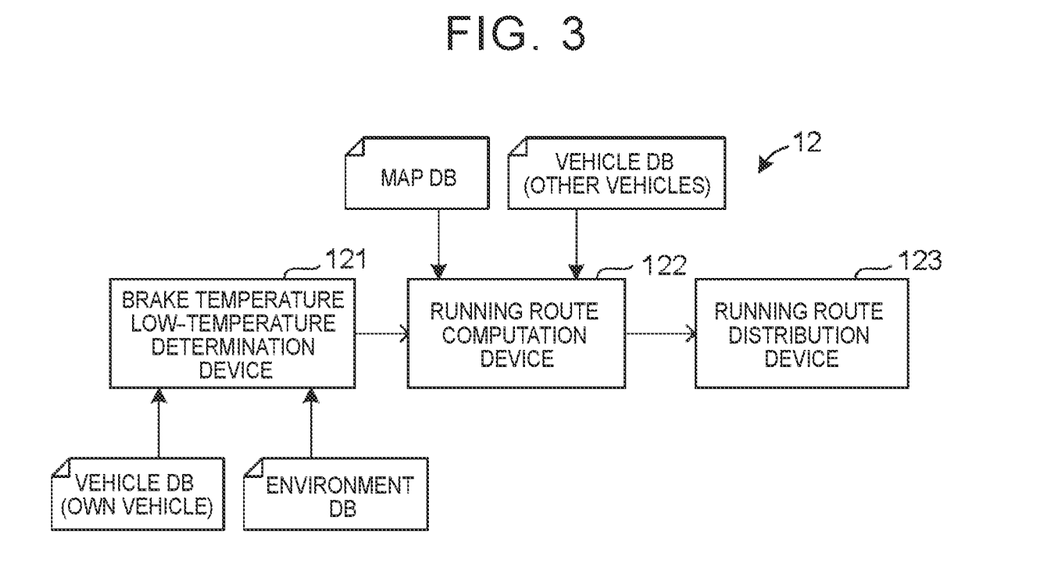
FIG. 3 is a view showing the configuration of a controlling server according to the embodiment.

In FIG. 3, the controlling server 12 has therein a brake temperature low-temperature determination device 121, a running route computation device 122, and a running route distribution device 123. Incidentally, "the brake temperature low-temperature determination device 121", "the running route computation device 122", and "the running route distribution device 123" may be reworded as "a brake temperature low-temperature determination function", "a running route computation function", and "a running route distribution function" respectively. "The brake temperature low-temperature determination device 121", "the running route computation device 122", and "the running route distribution device 123" will be referred to as "the low-temperature determination device 121", "the computation device 122", and "the distribution device 123" respectively, as appropriate.

A vehicle that is about to be parked in the parking place has run to the boarding area, and hence is considered to have been warmed up sufficiently. That is, the performance of the friction brake of the vehicle that is about to be parked is highly unlikely to have deteriorated as a result of a low-temperature environment. Thus, the operation performed by the parking lot administrative center 10 (especially the controlling server 12) on a vehicle that is about to be unloaded will be described. In this case, the vehicle 50 will be cited as the vehicle that is about to be unloaded.

The low-temperature determination device 121 of the controlling server 12 acquires a vehicle database (see "VEHICLE DB (OWN VEHICLE)" in FIG. 3) including a state, a specification, and the like regarding the vehicle 50 as the vehicle that is about to be unloaded. Incidentally, at least part of the information included in the vehicle database regarding the vehicle 50 may be acquired via the communication ECU 51 of the vehicle 50.

The low-temperature determination device 121 acquires an environment database (see "ENVIRONMENT DB" in FIG. 3) including information on, for example, the history of outside air temperature (i.e., a record of changes with time in outside air temperature) and the weather. Incidentally, the environment database may be acquired from a storage device (not shown) in the parking lot administrative center 10, or may be acquired via a network such as the Internet.

The low-temperature determination device 121 determines whether or not the vehicle 50 is in a low-temperature state, based on the vehicle database regarding the vehicle 50 and the environment database. That is, the low-temperature determination device 121 determines whether or not the vehicle 50 has been under a low-temperature environment. Incidentally, a concrete method of making this determination will be described later.

The computation device 122 of the controlling server 12 acquires a vehicle database (see "VEHICLE DB (OTHER VEHICLES) in FIG. 3) including states, specifications, and the like regarding other vehicles (vehicles (not shown) other than the vehicle 50 in this case). The information included in the vehicle database regarding other vehicles may reflect, for example, a result of recognition by the recognition server 11. Besides, at least part of the information included in the vehicle database regarding other vehicles may be acquired via communication ECU's (not shown) mounted in those vehicles respectively.

The computation device 122 acquires a map database (see "MAP DB" in FIG. 3) including a map of the parking lot. It should be noted herein that the map of the parking lot may include, for example, information on a passage structure of the parking lot, and information on static obstacles (fences, poles, curbstones, and the like). Incidentally, the map database may be acquired from the storage device (not shown) in the parking lot administrative center 10, or may be acquired via a network such as the Internet.

The computation device 122 computes a running route of the vehicle 50 based on a result of determination by the low-temperature determination device 121, the vehicle database regarding other vehicles, and the map database. Incidentally, a concrete example of the running route will be described later. Besides, various existing modes are applicable to a method of computing the running route, so the description of the details thereof will be omitted.

The distribution device 123 of the controlling server 12 distributes the running route computed by the computation device 122 to the vehicle 50 via the smart center 40. Incidentally, the computed running route may include information indicating, for example, an upper-limit speed and a target vehicle-to-vehicle distance. The distribution device 123 may transmit information on, for example, obstacles on the running route of the vehicle 50 as part of the result of recognition by the recognition server 11 as well as the running route, to the vehicle 50 via the smart center 40.

Figure 4:
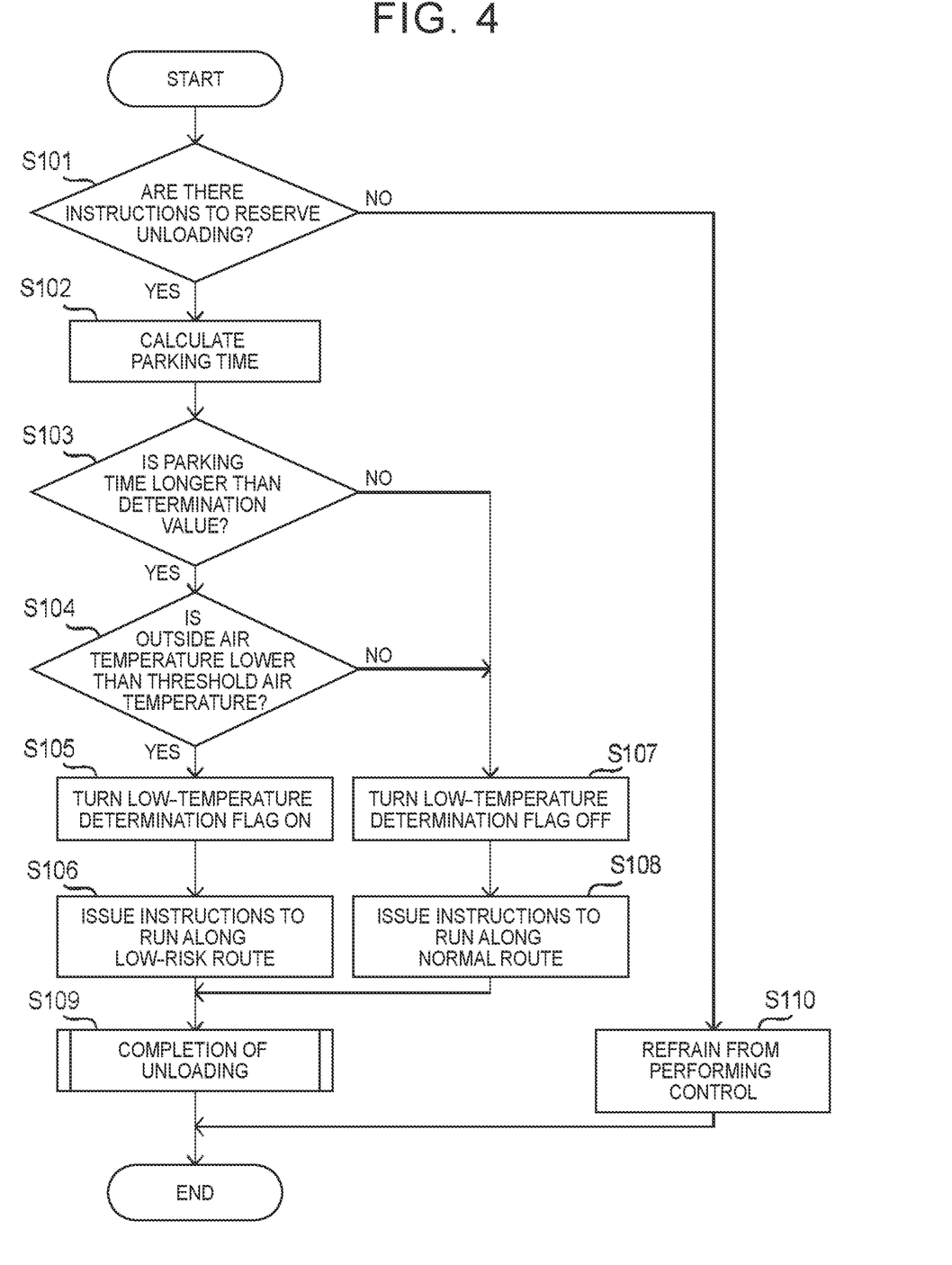
FIG. 4 is a flowchart showing an unloading operation according to the embodiment.

Next, the unloading operation of the controlling server 12 will be additionally described with reference to a flowchart of FIG. 4. In FIG. 4, the controlling server 12 determines whether or not there are instructions to reserve the unloading of the vehicle 50 (step S101). It should be noted herein that the controlling server 12 may determine that there are instructions to reserve unloading, upon receiving, for example, information indicating an unloading time or unloading instructions regarding the vehicle 50 from the reservation server 20. Besides, the controlling server 12 may determine that there are no instructions to reserve unloading, when no instructions have been issued within a predetermined period from the start of the processing of step S101.

If it is determined in the processing of step S101 that there are no instructions to reserve the unloading of the vehicle 50 (No in step S101), the controlling server 12 ends the operation shown in FIG. 4 without performing the control regarding the unloading of the vehicle 50 (step S110).

If it is determined in the processing of step S101 that there are instructions to reserve the unloading of the vehicle 50 (Yes in step S101), the low-temperature determination device 121 of the controlling server 12 calculates a parking time of the vehicle 50 as the vehicle that is about to be unloaded (step S102). At this time, the low-temperature determination device 121 may calculate the parking time based on, for example, the vehicle database regarding the vehicle 50.

In parallel with or immediately before or after the processing of step S102, the controlling server 12 transmits wakeup instructions to the vehicle 50 via the smart center 40. The vehicle 50 that has received the wakeup instructions performs predetermined wakeup control. At this time, the vehicle 50 performs a predetermined authentication process with the authentication server 30. When authentication is successful, the vehicle 50 and the controlling server 12 can communicate with each other via the smart center 40.

After that, the controlling server 12 transmits instructions to prepare for unloading to the vehicle 50 via the smart center 40. At this time, information on, for example, landmarks in the parking lot is distributed to the vehicle 50. The vehicle 50 estimates a position thereof in the parking lot (in other words, an initial position of unloading) based on, for example, positional information acquired by a navigation satellite system (NSS) or the like, an image photographed by at least one of the in-vehicle cameras, and the information on the landmarks.

Returning to FIG. 4, after the processing of step S102, the low-temperature determination device 121 determines whether or not the parking time calculated in the processing of step S102 is longer than a determination value (step S103). If it is determined in the processing of step S103 that the parking time is longer than the determination value (Yes in step S103), the low-temperature determination device 121 determines whether or not the outside air temperature is lower than a threshold temperature (step S104). It should be noted herein that the outside air temperature may be a current outside air temperature or an average outside air temperature during a parking period of the vehicle 50.

"The determination value" may be set as a minimum value of a time that is needed until the temperature of brake fluid in the vehicle immediately after the completion of parking falls sufficiently, or the like, on the assumption, for example, that the outside air temperature is low enough to cause a deterioration in the performance of the friction brake. "The threshold temperature" may be set as, for example, a maximum value of the air temperature at which the temperature of brake fluid in the vehicle may fall to the point of causing a deterioration in the performance of the friction brake, or the like.

If it is determined in the processing of step S104 that the outside air temperature is lower than the threshold air temperature (Yes in step S104), the low-temperature determination device 121 estimates that the vehicle 50 is in the low-temperature state (in other words, the vehicle 50 has been under a low-temperature environment that causes a deterioration in the performance of the friction brake), and turns a low-temperature determination flag ON (step S105).

Subsequently, the computation device 122 of the controlling server 12 computes a running route of the vehicle 50 based on a state of the low-temperature determination flag (i.e., a result of determination by the low-temperature determination device 121), the vehicle database regarding other vehicles, and the map database.

Figure 5A:
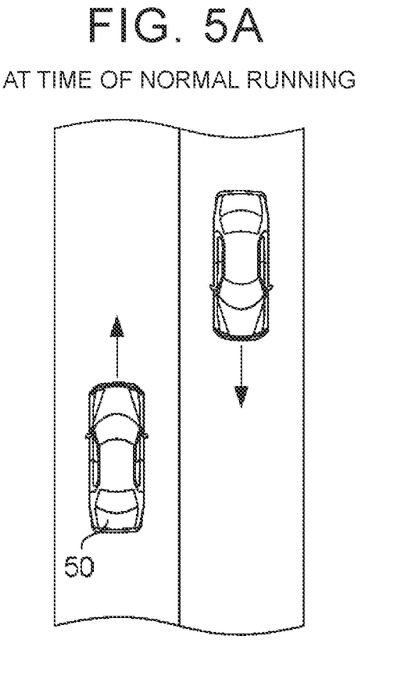
FIG. 5A is a view showing an example of a running route at a time of normal running.
Figure 5B:
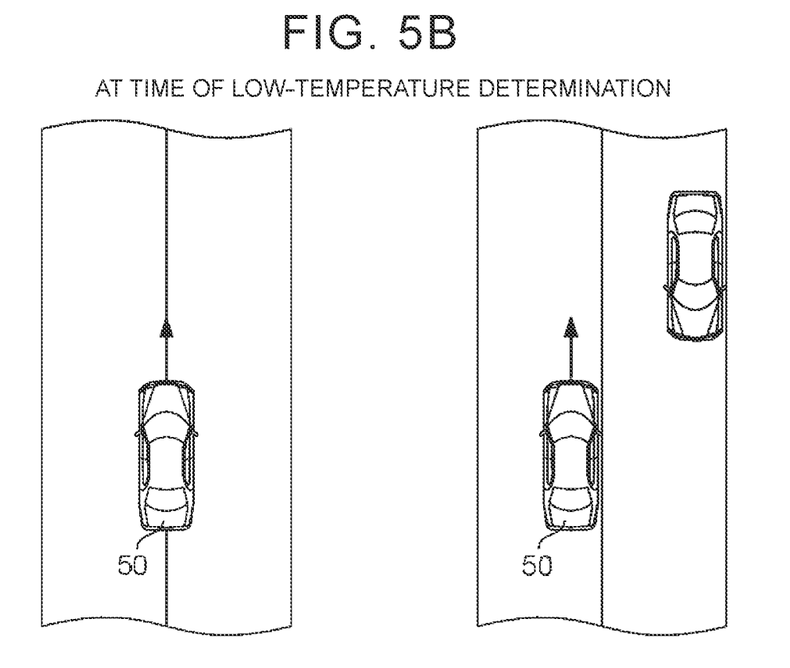
FIG. 5B is a view showing an example of a running route at a time of low-temperature determination.

Since the low-temperature determination flag is ON, the computation device 122 may compute a running route where the vehicle 50 runs near the center of a passage regardless of which lane the vehicle 50 is in (in other words, a running route where the distance between the vehicle 50 and an end portion of the passage is relatively long in a width direction of the passage), as shown in, for example, the left side of FIG. 5B. At this time, the computation device 122 may actively select a relatively wide passage from among the passages in the parking lot.

Incidentally, in the case where there is an oncoming vehicle (i.e., a different vehicle) in the passage where the vehicle 50 runs, the computation device 122 may compute a running route where the vehicle 50 runs close to an oncoming lane as shown in, for example, the right side of FIG. 5B. At this time, for example, instructions to move away from the vehicle 50 in the width direction of the passage and stop may be issued to the oncoming vehicle. That is, the controlling server 12 may set the running mode of the different vehicle that runs around the vehicle 50 as a running mode in which the risk resulting from a relationship with the vehicle 50 is reduced. More specifically, the running path of the different vehicle may be set as a running path where the risk resulting from the relationship with the vehicle 50 is reduced. The running route as shown in FIG. 5B will be referred to hereinafter as "a low-risk route" as appropriate.

It should be noted herein that when instructions are issued to the different vehicle (e.g., the oncoming vehicle), the controlling server 12 acquires the vehicle database regarding the different vehicle as "VEHICLE DB (OWN VEHICLE)" in FIG. 3, and acquires the vehicle database regarding the vehicle 50 as "VEHICLE DB (OTHER VEHICLES)". The computation device 122 of the controlling server 12 computes a running route of the different vehicle based on the vehicle database regarding the vehicle 50 as "VEHICLE DB (OTHER VEHICLES)" and the map database. The running route computed at this time may be a running route where the risk resulting from the relationship with the vehicle 50 is reduced (e.g., a running route where the vehicle runs close to the end portion of the passage). Besides, a running route where the vehicle temporarily stops at a predetermined position may be computed as the running route. As a result, the different vehicle can be moved away from the vehicle 50 and stopped as shown in, for example, FIG. 5B.

In computing the running route of the vehicle 50, the computation device 122 may also compute an upper-limit speed and a target vehicle-to-vehicle distance of the vehicle 50 running along the running route, as well as the running route. In this case, the upper-limit speed of the vehicle 50 may be set lower when taking "the low-risk route" than when taking "a normal route" that will be described later. Besides, the target vehicle-to-vehicle distance of the vehicle 50 may be set longer when taking "the low-risk route" than when taking "the normal route" that will be described later. In this manner, when the low-temperature determination flag is ON, the computation device 122 sets the running mode of the vehicle 50 as a low-risk running mode.

After that, the distribution device 123 of the controlling server 12 transmits information indicating the low-risk route computed by the computation device 122 to the vehicle 50 via the smart center 40. That is, the running route regarding the vehicle 50 is set as the low-risk route. At this time, the distribution device 123 may transmit the map of the parking lot included in the map database to the vehicle 50 via the smart center 40. After that, the controlling server 12 transmits instructions to start control to the vehicle 50 via the smart center 40 (step S106).

The vehicle 50 that has received the information indicating the low-risk route and the like generates a target running path where the vehicle 50 is to run through the function of automated driving, and the like. The vehicle 50 then runs from the parking space to the boarding area (see FIG. 1) along the low-risk route. The vehicle 50 that has arrived in the boarding area stands by (step S109). Incidentally, various existing modes are applicable to a method of generating the target running path, so the description of the details thereof will be omitted.

In the processing of step S109, when the vehicle 50 arrives in the boarding area, the vehicle 50 transmits information indicating the arrival of the vehicle 50 in the boarding area to the controlling server 12 via the smart center 40. The controlling server 12 that has received the information transmits instructions to end the control regarding unloading to the vehicle 50 via the smart center 40. The controlling server 12 then stops communicating with the vehicle 50. The vehicle 50 that has received the instructions to end the control regarding unloading performs predetermined shutdown control, and stands by.

If it is determined in the processing of step S103 that the parking time is shorter than the determination value (No in step S103) or if it is determined in the processing of step S104 that the outside air temperature is higher than the threshold air temperature (No in step S104), the low-temperature determination device 121 estimates that the vehicle 50 is not in the low-temperature state (in other words, the vehicle 50 is not under the low-temperature environment that causes a deterioration in the performance of the friction brake), and turns the low-temperature determination flag OFF (step S107). Incidentally, if it is determined in the processing of step S103 that the parking time is "equal to" the determination value, the result of the determination in step S103 may be regarded as either Yes or No. By the same token, if it is determined in the processing of step S104 that the outside air temperature is "equal to" the threshold air temperature, the result of the determination in step S104 may be regarded as either Yes or No.

Subsequently, the computation device 122 computes the running route of the vehicle 50 based on the state of the low-temperature determination flag, the vehicle database regarding other vehicles, and the map database. Since the low-temperature determination flag is OFF, the computation device 122 may compute a running route where the vehicle 50 runs near the center of a lane as shown in, for example, FIG. 5A. The running route as shown in FIG. 5A will be referred to hereinafter as "the normal route" as appropriate.

As described above, when computing the running route of the vehicle 50, the computation device 122 may also compute the upper-limit speed and target vehicle-to-vehicle distance of the vehicle 50 running along the running route, as well as the running route. In this case, the upper-limit speed of the vehicle 50 may be set higher when taking "the normal route" than when taking "the low-risk route". Besides, the target vehicle-to-vehicle distance of the vehicle 50 may be set shorter when taking "the normal route" than when taking "the low-risk route".

After that, the distribution device 123 of the controlling server 12 transmits information indicating the normal route computed by the computation device 122 to the vehicle 50 via the smart center 40. That is, the running route regarding the vehicle 50 is set as the normal route. After that, the controlling server 12 transmits instructions to start control to the vehicle 50 via the smart center 40 (step S108). As a result, the vehicle 50 runs from the parking space to the boarding area along the normal route. The vehicle 50 that has arrived in the boarding area stands by (step S109).

(Technical Effect)

In the system 1, when the vehicle 50 (i.e., the target vehicle) is in the low-temperature state (i.e., when the low-temperature determination flag is ON), the running route regarding the vehicle 50 is set as the low-risk route. When the low-risk route is taken, the distance from the vehicle 50 to an end portion of a passage is relatively long in the width direction of the passage as shown in, for example, FIG. 5B. Therefore, even when the braking distance is lengthened as a result of a deterioration in the performance of the friction brake, the possibility of, for example, the vehicle 50 colliding with an obstacle can be reduced.

As described above, when the low-risk route is taken, the upper-limit speed of the vehicle 50 may be set relatively low, and the target vehicle-to-vehicle distance of the vehicle 50 may be set relatively long. In this configuration, the possibility of, for example, the vehicle 50 colliding with an obstacle can be further reduced. Accordingly, the system 1 can restrain the level of safety in the parking lot from falling.

MODIFICATION EXAMPLE

In the foregoing embodiment, the low-temperature determination device 121 of the controlling server 12 makes a determination on low temperature when it is determined in the processing of step S101 that there are instructions to reserve unloading. However, the low-temperature determination device 121 may sequentially make a determination on low temperature as to a parked vehicle (i.e., a vehicle to be unloaded in the future).

As an example of the operation of making a determination on low temperature according to a modification example, the operation of making a determination on low temperature for the vehicle 50 parked in the parking lot will be described with reference to FIG. 6. Incidentally, the operation of making a determination on low temperature shown in FIG. 6 may be sequentially performed until the unloading of the vehicle 50 is completed, after the completion of the parking of the vehicle 50.

Figure 6:
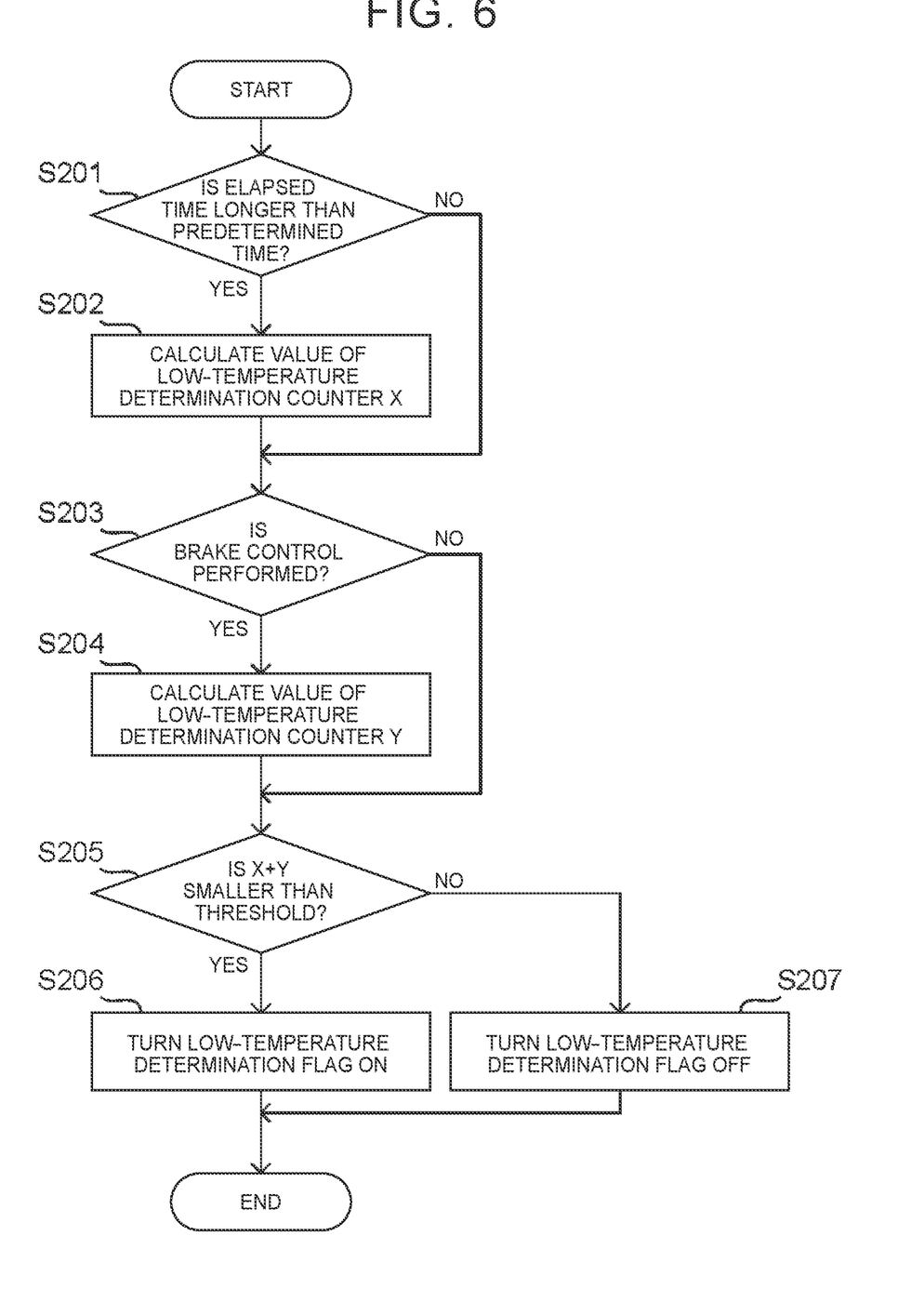
FIG. 6 is a flowchart showing a low-temperature determination operation according to a modification example of the embodiment.

In FIG. 6, the low-temperature determination device 121 determines whether or not an elapsed time since calculation of the value of a counter X regarding a low-temperature determination on the vehicle 50 is longer than a predetermined time (step S201). If it is determined in the processing of step S201 that the elapsed time is shorter than the predetermined time (No in step S201), the processing of step S203 that will be described later is performed.

If it is determined in the processing of step S201 that the elapsed time is longer than the predetermined time (Yes in step S201), the low-temperature determination device 121 calculates the value of the counter X regarding the low-temperature determination on the vehicle 50 (step S202).

It should be noted herein that the value of the counter X is obtained by integrating values of a first score that changes in accordance with the outside air temperature. For example, the first score decreases as the outside air temperature falls, and increases as the outside air temperature rises. Incidentally, the first score may not necessarily be a positive value, but may be zero or a negative value. The low-temperature determination device 121 obtains the first score every time it is determined in the processing of step S201 that the elapsed time is longer than the predetermined time (e.g., at intervals of a predetermined time). The low-temperature determination device 121 then obtains the value of the counter X by integrating n values of the first score obtained after the completion of the parking of the vehicle 50 (it should be noted herein that "n" is a natural number).

In the case where the vehicle 50 is provided with an outside air temperature sensor, the low-temperature determination device 121 may use an outside air temperature measured by the outside air temperature sensor of the vehicle 50 to obtain the first score. Alternatively, in the case where the vehicle 50 is provided with an outside air temperature sensor, the low-temperature determination device 121 may use an outside air temperature measured by the outside air temperature sensor of the vehicle 50 and the history of outside air temperature included in the environment database to obtain the first score.

The low-temperature determination device 121 determines whether or not the control regarding the friction brake has been performed in the vehicle 50 (step S203). If it is determined in the processing of step S203 that the control regarding the friction brake has not been performed (No in step S203), the processing of step S205 that will be described later is performed.

If it is determined in the processing of step S203 that the control regarding the friction brake has been performed (Yes in step S203), the low-temperature determination device 121 calculates a value of a counter Y regarding the low-temperature determination on the vehicle 50 (step S204).

It should be noted herein that the value of the counter Y is obtained by integrating values of a second score that changes in accordance with the period of performance of the control regarding the friction brake. For example, the second score decreases as the period of performance of the control regarding the friction brake shortens, and increases as the period of performance of the control regarding the friction brake lengthens. The low-temperature determination device 121 obtains the second score every time it is determined in the processing of step S203 that the control regarding the friction brake has been performed. The low-temperature determination device 121 then obtains the value of the counter Y by integrating m values of the second score obtained after the completion of the parking of a vehicle (e.g., the vehicle 50) (it should be noted herein that "m" is a natural number).

The low-temperature determination device 121 determines whether or not the sum of the values of the counter X and the counter Y regarding the low-temperature determination on the vehicle 50 is smaller than a threshold (step S205). If it is determined in the processing of step S205 that the sum is smaller than the threshold (Yes in step S205), the low-temperature determination device 121 turns the low-temperature determination flag ON (step S206). On the other hand, if it is determined in the processing of step S205 that the sum is larger than the threshold (No in step S205), the low-temperature determination device 121 turns the low-temperature determination flag OFF (step S207).

As an example of the unloading operation of the controlling server 12 according to the modification example, the operation of unloading the vehicle 50 will be described with reference to a flowchart of FIG. 7. The unloading operation shown in FIG. 7 is performed separately from the low-temperature determination operation shown in FIG. 6.

Figure 7:
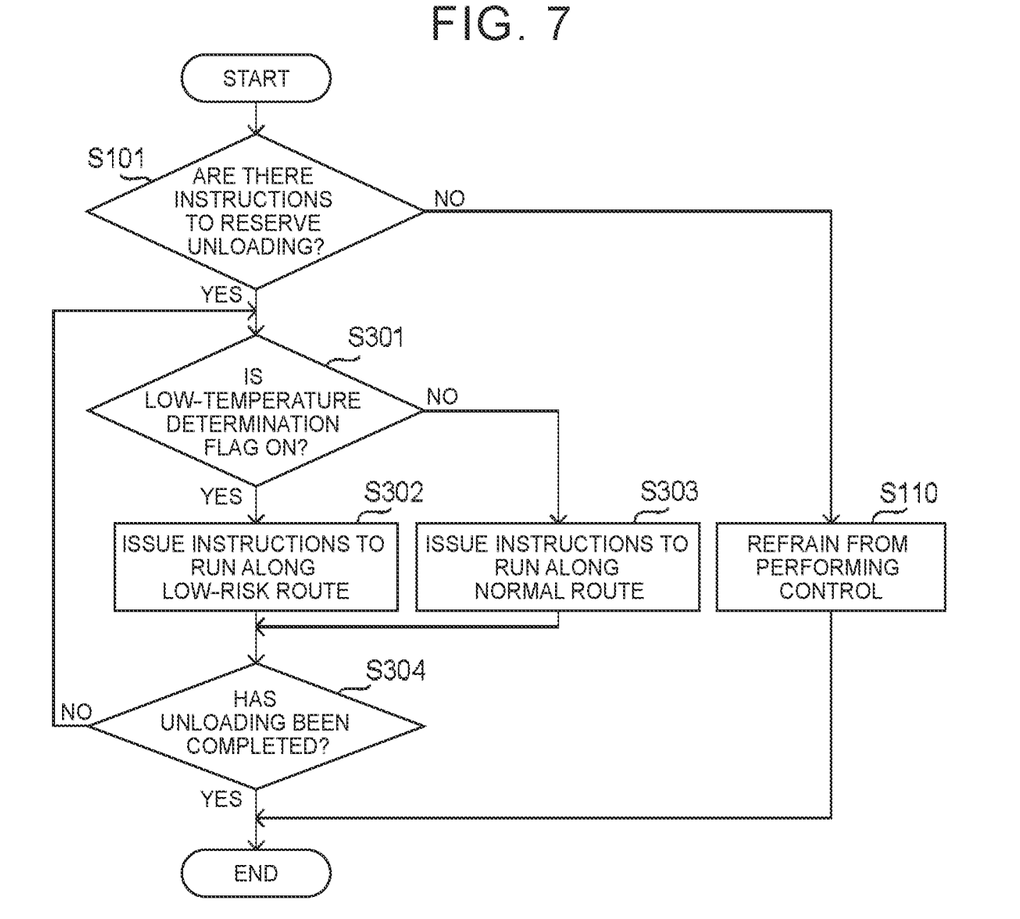
FIG. 7 is a flowchart showing an unloading operation according to the modification example of the embodiment.

In FIG. 7, the controlling server 12 determines whether or not there are instructions to reserve the unloading of the vehicle 50 (step S101). If it is determined in the processing of step S101 that there are no instructions to reserve the unloading of the vehicle 50 (No in step S101), the controlling server 12 does not perform the control regarding the unloading of the vehicle 50 (step S110), and the operation of unloading the vehicle 50 is ended.

If it is determined in the processing of step S101 that there are instructions to reserve the unloading of the vehicle 50 (Yes in step S101), the controlling server 12 determines whether or not the low-temperature determination flag is ON, based on a result of the operation of determining whether or not the vehicle 50 is at low temperature (see FIG. 6) (step S301).

If it is determined in the processing of step S301 that the low-temperature determination flag is ON (Yes in step S301), the computation device 122 of the controlling server 12 computes the low-risk route as the running route of the vehicle 50 based on the state of the low-temperature determination flag, the vehicle database regarding other vehicles, and the map database. After that, the distribution device 123 of the controlling server 12 transmits information indicating the low-risk route computed by the computation device 122 to the vehicle 50 via the smart center 40. After that, the controlling server 12 transmits instructions to start control to the vehicle 50 via the smart center 40 (step S302).

If it is determined in the processing of step S301 that the low-temperature determination flag is not ON (i.e., the low-temperature determination flag is OFF) (No in step S301), the computation device 122 computes the normal route as the running route of the vehicle 50, based on the state of the low-temperature determination flag, the vehicle database regarding other vehicles, and the map database. After that, the distribution device 123 transmits information indicating the normal route computed by the computation device 122 to the vehicle 50 via the smart center 40. After that, the controlling server 12 transmits instructions to start control to the vehicle 50 via the smart center 40 (step S303).

After the processing of step S302 or step S303, the controlling server 12 determines whether or not the unloading of the vehicle 50 has been completed (step S304). If it is determined in the processing of step S304 that the unloading of the vehicle 50 has been completed (Yes in step S304), the operation of unloading the vehicle 50 is ended.

If it is determined in the processing of step S304 that the unloading of the vehicle 50 has not been completed (No in step S304), the processing of step S301 is performed. As described above, the low-temperature determination operation shown in FIG. 6 is performed separately from the unloading operation shown in FIG. 7. Therefore, the state of the low-temperature determination flag may change due to the low-temperature determination operation shown in FIG. 6, until the unloading of the vehicle 50 is completed.

For example, if the low-temperature determination flag turns OFF when the vehicle 50 runs toward the boarding area (see FIG. 1) although the low-temperature determination flag is ON when the unloading of the vehicle 50 is started, the processing of step S303 is performed instead of the processing of step S302. That is, in this case, the low-risk running mode is canceled as to the vehicle 50.

Incidentally, in the processing of step S302, the computation device 122 may change the target vehicle-to-vehicle distance of the vehicle 50 in accordance with, for example, the value of the counter Y of the low-temperature determination operation shown in FIG. 6 (i.e., a value that is considered to reflect the temperature of brake fluid in the vehicle 50). That is, if the friction brake is controlled and the temperature of brake fluid is estimated to have risen when the vehicle 50 runs, the computation device 122 may shorten the target vehicle-to-vehicle distance of the vehicle 50. By the same token, the computation device 122 may change the upper-limit speed of the vehicle 50 in accordance with the value of the counter Y. That is, if the friction brake is controlled and the temperature of brake fluid is estimated to have risen when the vehicle 50 runs, the computation device 122 may raise the upper-limit speed of the vehicle 50.

<Computer Program>

Figure 8:
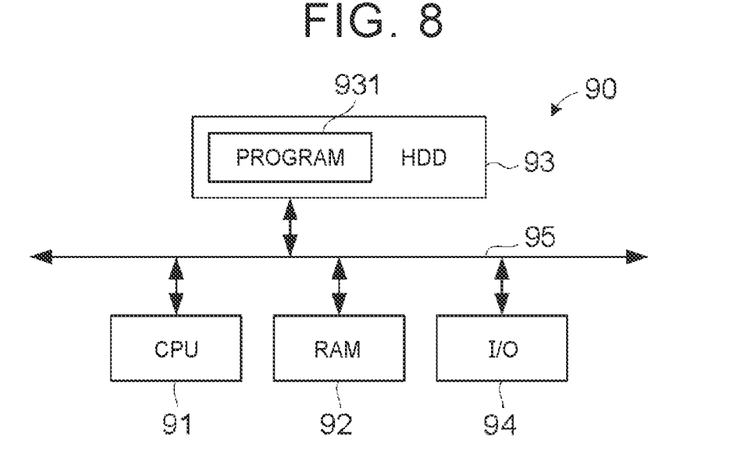
FIG. 8 is a view showing the configuration of a computer according to the embodiment.

A computer program 931 according to the embodiment will be described with reference to FIG. 8. FIG. 8 is a block diagram showing the configuration of a computer 90 according to the embodiment.

In FIG. 8, the computer 90 constitutes, for example, the controlling server 12. The computer 90 is configured to be equipped with a central processing unit (CPU) 91, a random access memory (RAM) 92, a hard disk drive (HDD) 93, and an input/output interface (I/O) 94. The CPU 91, the RAM 92, the HDD 93, and the I/O 94 are connected to one another by a bus 95. The computer program 931 according to the present embodiment is stored in advance in the HDD 93.

As an example of the process of the CPU 91 according to the computer program 931, the process of unloading the vehicle 50 will be described. The CPU 91 determines whether or not there are instructions to reserve the unloading of the vehicle 50. If it is determined that there are instructions to reserve the unloading of the vehicle 50, the CPU 91 calculates a parking time of the vehicle 50. The CPU 91 determines whether or not the parking time is longer than a determination value.

If it is determined that the parking time is longer than the determination value, the CPU 91 determines whether or not the outside air temperature is lower than a threshold air temperature. If it is determined that the outside air temperature is lower than the threshold air temperature, the CPU 91 estimates that the vehicle 50 is in the low-temperature state, and turns the low-temperature determination flag ON. On the other hand, if it is determined that the parking time is shorter than the determination value or if it is determined that the outside air temperature is higher than the threshold air temperature, the CPU 91 turns the low-temperature determination flag OFF.

Subsequently, the CPU 91 computes a running route of the vehicle 50 based on the state of the low-temperature determination flag, the vehicle database regarding other vehicles, and the map database. When the low-temperature determination flag is ON, the CPU 91 computes a low-risk route as the running route of the vehicle 50. On the other hand, when the low-temperature determination flag is OFF, the CPU 91 computes a normal route as the running route of the vehicle 50.

After that, the CPU 91 transmits the computed running route (i.e., the low-risk route or the normal route) to the vehicle 50 via the smart center 40. The CPU 91 then transmits instructions to start control to the vehicle 50 via the smart center 40.

Incidentally, the computer 90 may, for example, read the computer program 931 from a recording medium in which the computer program 931 is stored, such as an optical disc such as a compact disc read-only memory (CD-ROM) or a universal serial bus (USB) memory, and thereby store the computer program 931 into the HDD 93. Alternatively, the computer 90 may, for example, download the computer program 931 via a network such as the Internet, and thereby store the computer program 931 into the HDD 93.

As is the case with the system 1 in the foregoing embodiment, the computer program 931 can restrain the level of safety in the parking lot from falling. The computer program 931 can relatively easily realize, for example, the controlling server 12 in the foregoing embodiment.

Various aspects of the disclosure derived from the embodiment and modification example described above will be described hereinafter.

An automated parking system according to one aspect of the disclosure is equipped with an estimation unit that estimates a state of a target vehicle, and a setting unit that sets a running mode of the target vehicle as a low-risk running mode in which a risk regarding the target vehicle is reduced, on condition that the target vehicle be in a low-temperature state. In the foregoing embodiment, "the brake temperature low-temperature determination device 121" corresponds to an example of "the estimation unit", "the running route computation device 122" corresponds to an example of "the setting unit", and "the vehicle 50" corresponds to an example of "the target vehicle".

In the low-risk running mode, a running path regarding the target vehicle may be set as a running path where a distance between the target vehicle and an end portion of a passage is longer than in the case where the target vehicle is not in the low-temperature state.

In the automated parking system, the setting unit may set the running path regarding the target vehicle, based on map information. It should be noted herein that the map information may include information on a passage structure and information on a static obstacle.

In the low-risk running mode, a target vehicle-to-vehicle distance regarding the target vehicle may be set as a distance that is longer than in the case where the target vehicle is not in the low-temperature state.

In the low-risk running mode, an upper-limit speed regarding the target vehicle is set as a speed that is lower than in the case where the target vehicle is not in the low-temperature state.

In the automated parking system, the setting unit may cancel the low-risk running mode when the target vehicle for which the low-risk running mode is set ceases to be in the low-temperature state.

In the automated parking system, the setting unit may set a running mode of a different vehicle running around the target vehicle, as a running mode in which a risk resulting from a relationship with the target vehicle is reduced. In this mode, a running path of the different vehicle may be set as a running path where the risk resulting from the relationship with the target vehicle is reduced.

A setting method according to another aspect of the disclosure is a setting method in an automated parking system. The setting method includes an estimation process in which the automated parking system estimates a state of a target vehicle, and a setting process in which the automated parking system sets a running mode of the target vehicle as a low-risk running mode in which a risk regarding the target vehicle is reduced, on condition that the target vehicle be in a low-temperature state.

A storage medium according to still another aspect of the disclosure stores a computer program that causes a computer with which an automated parking system is equipped to function as an estimation unit that estimates a state of a target vehicle, and a setting unit that sets a running mode of the target vehicle as a low-risk running mode in which a risk regarding the target vehicle is reduced, on condition that the target vehicle be in a low-temperature state.

The disclosure is not limited to the foregoing embodiment, but can be altered as appropriate within a range that does not contradict the gist or idea of the disclosure that can be interpreted from the claims and the entire specification. An automated parking system, a setting method, and a storage medium that are subject to such alterations also fall within the technical scope of the disclosure.

What is claimed is:

1. An automated parking system comprising:
   an estimation unit that estimates whether a target vehicle has been under a low-temperature environment that causes a deterioration in a performance of a friction brake of the target vehicle such that a risk of the target vehicle colliding with an obstacle is enhanced; and
   a setting unit that sets a running mode of the target vehicle as a low-risk running mode in which the risk of the target vehicle colliding with the obstacle is reduced, in response to the target vehicle being estimated to be under the low-temperature environment that causes the deterioration in the performance of the friction brake of the target vehicle.

2. The automated parking system according to claim 1, wherein
   a running path regarding the target vehicle is set as a running path where a distance between the target vehicle and an end portion of a passage is longer than in a case where the target vehicle is not in the low-temperature environment, in the low-risk running mode.

3. The automated parking system according to claim 2, wherein
   the setting unit sets the running path regarding the target vehicle, based on map information.

4. The automated parking system according to claim 3, wherein
   the map information includes information on a passage structure and information on a static obstacle.

5. The automated parking system according to claim 1, wherein
   a target vehicle-to-vehicle distance regarding the target vehicle is set as a distance that is longer than in a case where the target vehicle is not in the low-temperature environment, in the low-risk running mode.

6. The automated parking system according to claim 1, wherein
   an upper-limit speed regarding the target vehicle is set as a speed that is lower than in a case where the target vehicle is not in the low-temperature environment, in the low-risk running mode.

7. The automated parking system according to claim 1, wherein
   the setting unit cancels the low-risk running mode when the target vehicle for which the low-risk running mode is set ceases to be in the low-temperature environment.

8. The automated parking system according to claim 1, wherein
   the setting unit sets a running mode of a different vehicle running around the target vehicle, as a running mode in which a risk resulting from a relationship with the target vehicle is reduced.

9. The automated parking system according to claim 8, wherein
   a running path of the different vehicle is set as a running path where the risk resulting from the relationship with the target vehicle is reduced, in a running mode in which a risk of a collision with the target vehicle is reduced.

10. A setting method in an automated parking system, the setting method comprising:
    an estimation process in which the automated parking system estimates whether a target vehicle has been under a low-temperature environment that causes a deterioration in a performance of a friction brake of the target vehicle such that a risk of the target vehicle colliding with an obstacle is enhanced; and
    a setting process in which the automated parking system sets a running mode of the target vehicle as a low-risk running mode in which the risk of the target vehicle colliding with the obstacle is reduced, in response to the target vehicle being estimated to be under the low-temperature environment that causes the deterioration in the performance of the friction brake of the target vehicle.

11. A non-transitory storage medium storing a computer program that causes a computer with which an automated parking system is equipped to function as
    an estimation unit that estimates whether a target vehicle has been under a low-temperature environment that causes a deterioration in a performance of a friction brake of the target vehicle such that a risk of the target vehicle colliding with an obstacle is enhanced; and a setting unit that sets a running mode of the target vehicle as a low-risk running mode in which the risk of the target vehicle colliding with the obstacle is reduced, in response to the target vehicle being estimated to be under the low-temperature environment that causes the deterioration in the performance of the friction brake of the target vehicle.

* * * * *